US010706086B1

(12) United States Patent
Didericksen et al.

(10) Patent No.: US 10,706,086 B1
(45) Date of Patent: Jul. 7, 2020

(54) COLLABORATIVE-FILTERING BASED USER SIMULATION FOR DIALOG SYSTEMS

(71) Applicant: Amazon Technologies, Inc., Seattle, WA (US)

(72) Inventors: Devin Didericksen, Bothell, WA (US); Jared Kane Kramer, Seattle, WA (US); Oleg Rokhlenko, Issaquah, WA (US); Kevin Michael Small, Seattle, WA (US); Li Zhou, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/919,183

(22) Filed: Mar. 12, 2018

(51) Int. Cl.
    *G06F 16/00*     (2019.01)
    *G06F 16/332*     (2019.01)
    *G06K 9/62*     (2006.01)

(52) U.S. Cl.
    CPC ....... *G06F 16/3329* (2019.01); *G06K 9/6215* (2013.01); *G06K 9/6267* (2013.01)

(58) Field of Classification Search
    CPC ........ G06F 9/44; G06F 16/3329; G06F 17/30; G06F 17/27; G06F 17/28; G06F 16/00; G06F 9/38; G06F 9/54; G06K 9/00; G06K 9/6215; G06K 9/6267; G10L 15/00; G10L 15/22; G10L 15/02; H04L 12/58; H04L 29/06; G06N 99/00
    USPC ............ 379/265.09; 703/2; 704/9, 238, 239, 704/256, 257, 270, 270.1, 235, 256.1, 704/266, 275; 706/12, 16; 709/203, 227; 705/7.32, 304; 707/734; 235/462.25; 370/393; 711/4

See application file for complete search history.

(56) References Cited

U.S. PATENT DOCUMENTS

| | | | | |
|---|---|---|---|---|
| 5,353,377 A * | 10/1994 | Kuroda | ................. | G09B 19/04 704/251 |
| 6,728,679 B1 * | 4/2004 | Strubbe | ................... | G06F 3/011 704/270.1 |
| 7,046,669 B1 * | 5/2006 | Mauger | ............... | H04L 12/4633 370/351 |
| 8,296,144 B2 * | 10/2012 | Weng | ..................... | G10L 15/01 704/246 |
| 8,660,844 B2 * | 2/2014 | Williams | ................ | G10L 15/01 704/239 |
| 8,676,583 B2 * | 3/2014 | Gupta | ..................... | G10L 15/22 704/256 |
| 9,740,677 B2 * | 8/2017 | Kim | ........................ | G06F 17/27 |
| 9,785,891 B2 * | 10/2017 | Agarwal | ................ | G06N 20/00 |

(Continued)

*Primary Examiner* — Gerald Gauthier
(74) *Attorney, Agent, or Firm* — Nicholson De Vos Webster & Elliot, LLP

(57) ABSTRACT

Techniques for simulating a user in a conversation are described. A user simulation service and a conversation agent service conduct a dialog. The user simulation service compares a current sequence of stored labels corresponding to statements in the dialog with a plurality of candidate sequences of labels corresponding to statements in a plurality of candidate dialogs to identify a matching sequence of labels. The user simulation sequence identifies a base sequence of labels that includes the matching sequence of labels to identify a label corresponding to an act in the base sequence of labels following the matching sequence of labels. The user simulation service issues the act to the conversation agent service to be used as a simulated user act.

20 Claims, 9 Drawing Sheets

(56) References Cited

U.S. PATENT DOCUMENTS

| | | | |
|---|---|---|---|
| 9,792,909 B2* | 10/2017 | Kim | G10L 15/26 |
| 10,013,416 B1* | 7/2018 | Bhardwaj | G10L 15/18 |
| 10,073,840 B2* | 9/2018 | Hakkani-Tur | G06F 17/28 |
| 10,114,816 B1* | 10/2018 | Srivastava | G06F 17/279 |
| 10,176,808 B1* | 1/2019 | Lovitt | G06F 16/635 |
| 10,217,462 B2* | 2/2019 | Sarikaya | G10L 15/183 |
| 10,235,358 B2* | 3/2019 | Tur | G06F 17/2785 |
| 10,382,370 B1* | 8/2019 | Labarre | H04L 51/14 |
| 10,382,623 B2* | 8/2019 | Lev-Tov | H04M 3/493 |
| 2003/0042312 A1* | 3/2003 | Cato | G02B 26/123 235/462.25 |
| 2006/0129637 A1* | 6/2006 | Yoshida | G06F 3/16 709/203 |
| 2006/0206332 A1* | 9/2006 | Paek | G10L 15/063 704/257 |
| 2009/0193123 A1* | 7/2009 | Mitzlaff | G06Q 30/08 709/227 |
| 2010/0332287 A1* | 12/2010 | Gates | G06F 17/277 705/7.32 |
| 2011/0010164 A1* | 1/2011 | Williams | G10L 15/063 704/9 |
| 2011/0119196 A1* | 5/2011 | Ventura | G06Q 10/10 705/304 |
| 2011/0231182 A1* | 9/2011 | Weider | G10L 15/22 704/9 |
| 2012/0330869 A1* | 12/2012 | Durham | G06N 5/022 706/16 |
| 2013/0325468 A1* | 12/2013 | Lee | G09B 19/04 704/238 |
| 2014/0067375 A1* | 3/2014 | Wooters | G06F 17/28 704/9 |
| 2014/0288896 A1* | 9/2014 | Li | G01C 19/38 703/2 |
| 2014/0317030 A1* | 10/2014 | Shen | G06N 3/006 706/12 |
| 2015/0127350 A1* | 5/2015 | Agiomyrgiannakis | G10L 13/02 704/266 |
| 2015/0228272 A1* | 8/2015 | Gupta | G10L 15/14 704/235 |
| 2015/0256677 A1* | 9/2015 | Konig | H04M 3/5191 379/265.09 |
| 2016/0034393 A1* | 2/2016 | Wu | G06F 3/0656 711/4 |
| 2016/0132590 A1* | 5/2016 | Byron | G06F 16/338 707/734 |
| 2017/0256261 A1* | 9/2017 | Froelich | G10L 15/02 |
| 2017/0286494 A1* | 10/2017 | He | G06F 16/24537 |
| 2017/0286755 A1* | 10/2017 | Kaletsky | G06F 17/24 |
| 2017/0289070 A1* | 10/2017 | Plumb | H04L 51/02 |
| 2017/0353405 A1* | 12/2017 | O'Driscoll | H04L 51/02 |
| 2018/0052664 A1* | 2/2018 | Zhang | G06F 8/34 |
| 2018/0053119 A1* | 2/2018 | Zeng | G06N 20/00 |
| 2018/0173714 A1* | 6/2018 | Moussa | G06F 17/279 |
| 2018/0181404 A1* | 6/2018 | Ido | G06F 9/3844 |
| 2018/0189408 A1* | 7/2018 | O'Driscoll | H04L 51/32 |
| 2018/0225365 A1* | 8/2018 | Altaf | G06F 17/27 |
| 2018/0232436 A1* | 8/2018 | Elson | G06F 16/00 |
| 2018/0268818 A1* | 9/2018 | Schoenmackers | G10L 15/22 |
| 2018/0324215 A1* | 11/2018 | Kalia | H04L 63/20 |
| 2019/0018657 A1* | 1/2019 | Landowski | G06F 8/34 |
| 2019/0130308 A1* | 5/2019 | Chickering | G06N 20/00 |
| 2019/0266287 A1* | 8/2019 | Chen | G06F 9/547 |

* cited by examiner

COLLABORATIVE-FILTERING BASED USER SIMULATION FOR DIALOG SYSTEMS

BACKGROUND

Conversational agents ("CA"), or dialog agents, serves as a computer interface in many applications. Examples of such agents include smart personal digital assistants and smart home controllers and automated telephone answering services (e.g., making statements during a telephone call to a business to determine business hours). Existing agents typically offer some pre-defined set of capabilities (e.g., play a song, set a timer, add a reminder, etc.) using the CA as a frontend with a backend providing the heavy lifting. For example, to aid a user in booking a flight on an airline, a CA may analyze a user's speech to determine some set of information necessary to identify available flights (e.g., departure city, destination city, date and time, whether one-way or round-trip) and a backend associated with the CA passes obtains information on available flights.

BRIEF DESCRIPTION OF DRAWINGS

Various embodiments in accordance with the present disclosure will be described with reference to the drawings, in which.

DETAILED DESCRIPTION

Various embodiments of methods, apparatus, systems, and non-transitory computer-readable storage media for simulating a user side of a conversation, or dialog, for training a conversational agent ("CA") are described. According to some embodiments, a user conversation simulator statistically evaluates an ongoing dialog with a CA against a set of previously recorded dialogs. At each stage of the ongoing dialog, the user conversation simulator identifies a "best" user utterance to output back to the CA. Embodiments of the disclosed user simulator approaches dramatically increase the amount of training data available for training CAs. Many user models often operate at the individual user level based that user's history and attempt to predict that user's next act. As a result, these models limit the scope of CA training to the scope of the user's history. That limitation is particularly problematic in larger problem domains (e.g., healthcare, customer service) in which the set of possible user and agent actions is orders of magnitude larger than other CA applications (e.g., playing a song, booking a flight) and users may not have any history in the domain. The user simulation embodiments described herein aggregate individual user behavior into a statistical model that produces realistic, context-sensitive, and diverse responses during CA training.

Figure 1:
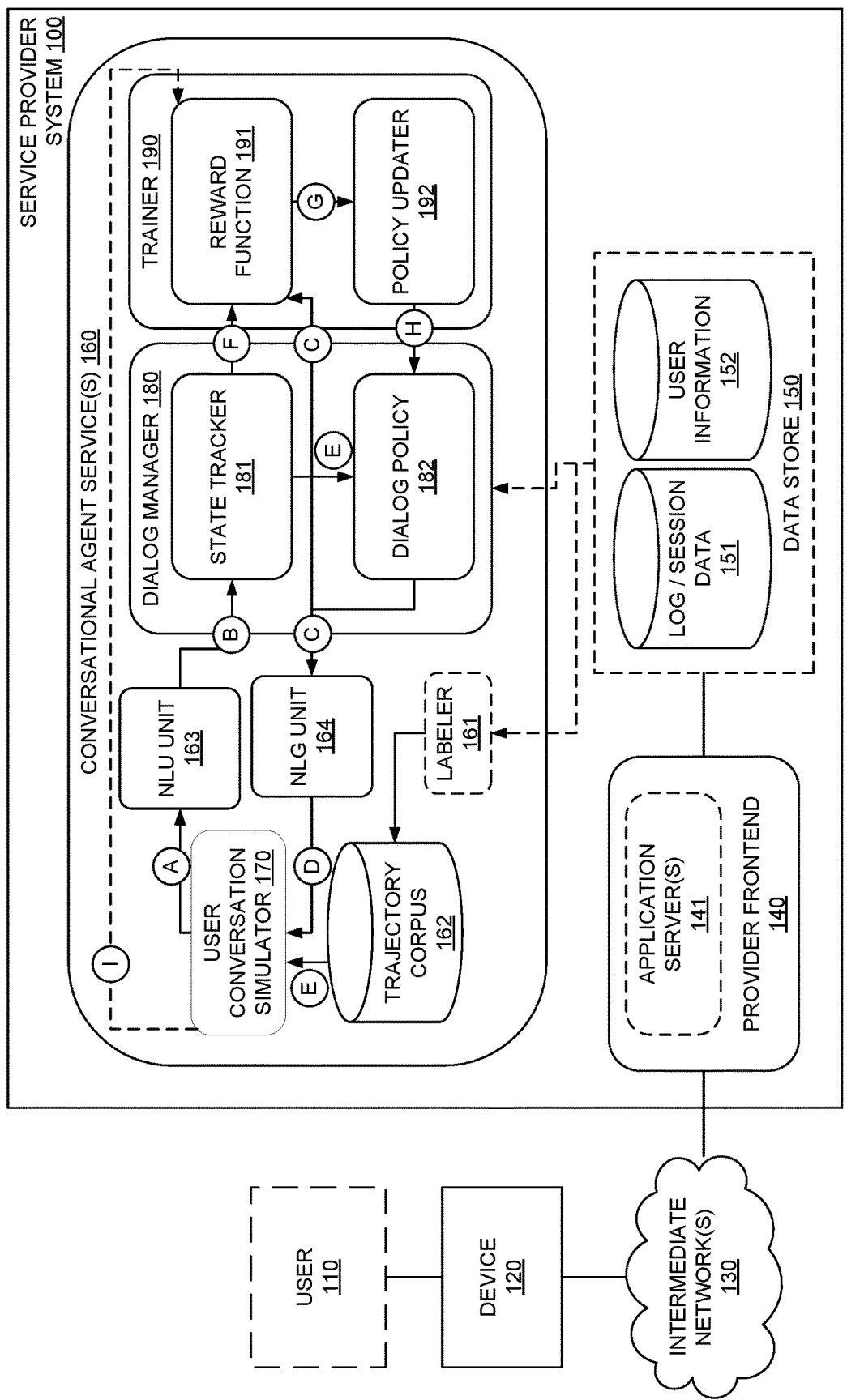
FIG. 1 illustrates an environment for training a conversation agent service according to some embodiments.

FIG. 1 illustrates embodiments of an environment for training a CA service. As shown, service provider system 100 includes CA service(s) 160 having a dialog manager 180. The various components of service provider system 100, including CA service(s) 160, may be implemented as software, hardware (e.g., application specific integrated circuits, field programmable gate arrays, microprocessors), or a combination of both. Software components (e.g., services) are stored as instructions in one or more volatile or non-volatile memories (not shown) and executed by one or more processors (not shown), which may be part of a single computer or a distributed computing environment. Data, including log or session data 151, user information 152, and trajectory corpus 162 are stored in one or more volatile or non-volatile memories (not shown) accessible by the other hardware including the processor(s).

In general, a trained dialog manager is responsible for the "computer-side" of a dialog during a human user interaction with a CA. To train dialog manager 180, CA service(s) 160 include a user conversation simulator 170 (to act as a user in simulated training conversations) and trainer 190 (to adjust dialog manager 180 based on its performance as measured against some criteria).

At a high-level, the flow of a training conversation is indicated by circles A through D, one cycle of which represents each side in the conversation having had a "turn" at making a statement or acting in the simulated conversation. Circles E through I are described below. At circle A, user conversation simulator 170 outputs a user utterance (e.g., a statement) to natural language understanding ("NLU") unit 163. At circle B, NLU unit 163 processes the user utterance to "understand" what the user said and passes a message indicative of that understanding to the dialog manager 180. Dialog manager 180 uses the message from the NLU unit 163 to determine an action for the agent to take in the dialog, and outputs a message indicative of that action at circle C. Natural language generation ("NLG") unit 164 receives the message from dialog manager 180 and translates it into an agent utterance, which is then passed to the user conversation simulator 170 at circle D. As described in greater detail below, user conversation simulator 170 evaluates the agent utterance along with a trajectory corpus 162 to determine the next user utterance to output on the next "turn" at circle A. As described in greater detail below with reference to FIGS. 2 and 4, trajectory corpus 162 is built by labeler 161 in some embodiments.

An exemplary conversation flow is as follows:
at circle A, the utterance "I have a sore throat" passes from user conversation simulator 170 to NLU unit 163;
at circle B, a message indicating the patient has a sore throat passes from NLU unit 163 to dialog manager 180;
at circle C, a message indicating the need for additional symptoms passes from dialog manager 180 to NLG unit 164; and
at circle D, the utterance "I'm sorry to hear about your sore throat. Are you experiencing any other symptoms?" passes from NLG unit 164 to user conversation simulator 170.

The messages passed to the NLU unit 163 and from the NLG unit 164 are referred to as dialog acts. A "dialog act" refers to the semantic representation of a user utterance or statement in some embodiments; examples of utterances and their corresponding dialog acts are provided later in this description. The inclusion of NLU unit 163 and NLG unit 164 can depend on whether user conversation simulator 170 and dialog manager 180 communicate at a statement-level or dialog act-level.

Reinforcement learning ("RL") can be used to train dialog manager 180. At a high level, RL involves inputting a large number of training samples to dialog manager 180 and evaluating its performance against some criteria. A sample may be one turn of the user-agent dialog, a complete dialog, or multiple dialogs. After each sample, dialog manager 180 is updated based on its performance for that sample.

In the embodiment depicted in FIG. 1, the dialog manager 180 is based on a Markov Decision Process ("MDP") model. In this model, dialog manager 180 tracks the state of the ongoing dialog with state tracker 181. Each time a user dialog act is received, state tracker 181 determines a new dialog state based on the user dialog act and the current dialog state. At circle E, based on the new dialog state, dialog manager 180 uses dialog policy 182 to determine the next agent dialog act to output at circle C. To train the dialog manager 180, trainer 190 receives as parameters the new dialog state and the previous dialog state (circle F) and the agent dialog act (circle C). Trainer 190 evaluates these parameters with a reward function 191, the result of which (circle G) is evaluated by policy updater 192. The reward function 191 may be evaluated after some number of cycles of dialog to maximize the reward over, e.g., portions of an entire dialog, an entire dialog, groups of dialogs, etc. At circle H, policy updater 192 outputs a policy update to the dialog manager 180 to modify the dialog policy 182 and thus how ongoing dialog states are translated into agent dialog acts. In some embodiments, user conversation simulator 170 outputs a feedback value to trainer 190, which may be used as an input to reward function 191 to indicate how closely the current conversation is tracking an existing dialog, as discussed below.

Note that each time a conversation is introduced during training, either the user conversation simulator 170 or the dialog manager 180 may be responsible for initiating the dialog with a seed utterance or dialog act.

The environment illustrated in FIG. 1 further shows device 120 in communication with service provider system 100 via one or more intermediate network(s) 130. Device 120, which may also be referred to as a client device, can be any device operable to send and receive requests, messages or information over intermediate network(s) 130. Examples of such client devices include personal computers (PCs), cell phones, handheld messaging devices, laptop computers, set-top boxes, personal data assistants, electronic book readers, wearable electronic devices (e.g., glasses, wristbands, monitors), telephones, and the like.

The intermediate network(s) 130 can include any appropriate network, including an intranet, the Internet, a cellular network, a local area network, a telephone system, or any other such network or combination thereof. Components and protocols used for such a system can depend at least in part upon the type of network and/or environment selected. Communication over the network can be via wired or wireless connections and combinations thereof.

In some embodiments, user 110 operates device 120, and device 120 conveys information back to the user 110. In other embodiments, however, device 120 may be operated by a computer program running on a processor, effectively creating a computer-to-computer dialog via CA.

In one embodiment, device 120 communicates with provider frontend 140 of service provider system 100 via intermediate network(s) 130, such as the Internet. Provider frontend 140 can include application server 141 or some other combination of hardware and/or software that provides access to outward facing services and components of service provider system 100. In some embodiments, CA service(s) 160 can be implemented as an application server 141.

There can be several application servers, layers, or other elements, processes or components, which may be chained or otherwise configured, which can interact to perform tasks involving other components of service provider system 100. Application server 141 can include any appropriate hardware and software for integrating with the other components of service provider system 100 to provide associated functionality to device 120. For example, application server 141 may access data store 150 or, as discussed below with reference to FIG. 8, CA services 805. Application server 141 can provide access to content such as text, graphics, audio, video, etc., to device 120. In some embodiments, provider frontend 140 may include an application server acting as a web server (not shown), and serve content in the form of HyperText Markup Language (HTML), Extensible Markup Language (XML), JavaScript Object Notation (JSON), or another appropriate unstructured or structured language.

In some embodiments, service provider system 100 includes data store 150. The data store 150 can include several separate data tables, databases, or other data storage mechanisms and media for storing data relating to a particular aspect. In some embodiments, a "data store" is a device or combination of devices capable of storing, accessing and retrieving data, which may include any combination and number of data servers, databases, data storage devices and data storage media, in any standard, distributed or clustered environment. There can be many other aspects that may be stored in the data store, such as page image information and access rights information, which can be stored in any of the above listed mechanisms as appropriate or in additional mechanisms in the data store 150. The data store 150 is operable, through logic associated therewith, to receive instructions from other components of the service provider system 100 and obtain, update, or otherwise process data in response thereto.

In one example, a user requests a list of previously access products or services from an application server 141. In this case, the application server 141 instructs data store 150 to access the user information 152 to verify the identity of the user and to access log or session data 151 to obtain information about the products or services that the user has previously accessed. The information is then be returned to the user, such as in a listing of results on a web page that the user is able to view on the device 120.

Log or session data 151 can include recorded dialogs between users and human agents of service provider system 100. For example, if service provider system 100 provides customer support via chat, log or session data 151 can store logs of chat sessions. Similarly, when service provider system 100 provides customer support via telephone or another audio mechanism, log or session data 151 includes transcribed logs.

The provider frontend 140, data store 150, and/or CA service(s) 160 may be implemented by one or more electronic devices, which can also be referred to as electronic server devices or server end stations, and may or may not be located in different geographic locations. Each of the one or more electronic devices may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

In one embodiment, the environment depicted in FIG. 1 is a distributed computing environment utilizing several computer systems and components that are interconnected via communication links, using one or more computer networks or direct connections. However, it will be appreciated by those of ordinary skill in the art that such a system could operate in a system having fewer or a greater number of components than are illustrated in FIG. 1. Thus, the depiction of the environment in FIG. 1 should be taken as being illustrative in nature and not limiting to the scope of the disclosure.

Figure 2:
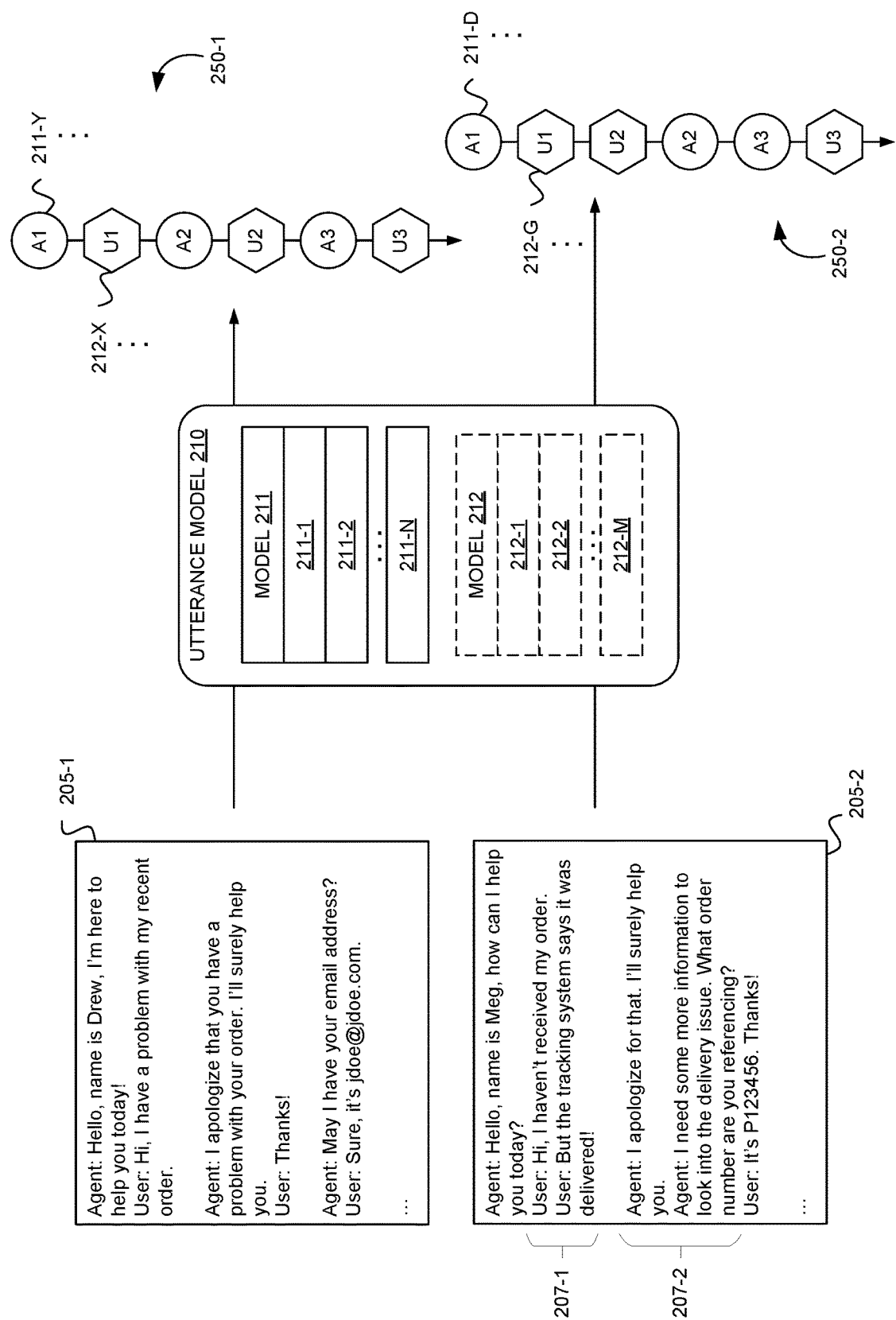
FIG. 2 illustrates an approach to modeling dialogs according to some embodiments.

FIG. 2 illustrates an approach to modeling dialogs according to some embodiments. As described below, user conversation simulator 170 uses a model of a dialog to simulate user conversation. In typical conversation, each party acts by making statements that direct the flow of the dialog. Under the approach depicted in FIG. 2 and as explained below, the flow of a dialog is modeled as a trajectory, which includes a sequence of dialog acts based on classifications of the sequence of statements in a dialog. Exemplary dialogs 205-1 and 205-2 depict two-party conversations between an agent and a user. As used herein, the term "speaker" refers to a party in a dialog, regardless of the source of that dialog (e.g., audio transcript, text-based log, etc.).

An utterance model 210 classifies statements in a dialog to the associated dialog act of the speaker. For example, the statement, "Hello, my name is Jane," can be classified as a salutation. An utterance model can include a plurality of dialog act models, where each dialog act model defines the set of possible dialog acts of one or more speakers. For example, utterance model 210 includes dialog act ("DA") model 211. Given dialogs 205, DA model 211 can model user statements, agent statements, or both user and agent statements. Alternatively, utterance model 210 can include a second DA model 212 such that DA model 211 applies to agent statements and DA model B12 applies to user statements. DA models generally include a plurality of classifiers that may be determined based on the linguistic characteristics of the party being modeled. DA model 211 includes classifiers 211-1 through 211-N for one party or group of parties, and DA model 212 includes classifiers 212-1 through 212-M for a different party or group of parties. In some embodiments, each classifier is a label that is applicable to a certain type of a party's statements.

In some embodiments, a DA model includes a hierarchical classification model. For example, statements could be classified using an <ACTION> and <SPECIFIER>. The model can include several actions such as "Salutation" or "Request." Within the "Salutation" action, there may be several specifiers such as "Greeting" (for the statement, "Hi, my name is <NAME>") and "Closing" (for the statement "Thank you for contacting us."). Likewise, within the "Request" action, there may be several specifiers such as "Identity" (for the statement, "Who am I speaking with today?") and "Delay" (for the statement ("Please wait one moment while I research the issue."). Other exemplary classifiers may differentiate among topical areas or among types of users as they pertain to service provider system 100. For example, one classifier may indicate a user is requesting information about a particular health topic that a user has indicated they subscribe to a premium service package.

In some embodiments, multiple trajectories 250 may be created from the same dialog. For example, often during a customer service interaction, the agent asks the customer whether there is anything else the agent can assist with, which may be classified as a transition dialog act. In such cases, if any substantive (e.g., non-salutatory) DA model classifiers appear after the transition, or if the number of statements in the remainder of the dialog exceeds a threshold, the remainder of the dialog may form a second, third, fourth, etc. trajectory.

DA models may be pre-defined or derived from the dialogs in the log or session data 151. As an example of the former case, a dialog model may be based on constraints placed on a party's role in the conversation. For example, training documentation or phrase books for customer service agents generally includes a fixed set of actions or flows that the agent can take, along with techniques for keeping a conversation on track. A dialog model can be derived from these constraints and propagated across all dialogs in log or session data 251 to generate corresponding trajectories.

If training documentation or other types of scope-restrictive materials are unavailable, unsupervised cluster analysis techniques may be used to identify dialog act classifications. For example, some subset of the statements in log or session data 251 can be modeled as numeric vectors (e.g., using a bag-of-words model). Cluster analysis can be applied to those vectors. The resulting clusters can be assigned classifications, either manually or based on some frequently occurring or shared token, word, phrase, or other indicator among each cluster's members. As before, a dialog model can be derived from these classifications and propagated across all dialogs in log or session data 251 to generate corresponding trajectories.

In general, trajectories 250 are created based on a source dialog and an utterance model. For example, trajectories 250-1 and 250-2 include a sequence of classified actions corresponding to dialogs 205-1 and 205-2, respectively. In trajectories 250-1 and 250-2, a circle indicates an agent dialog act and a hexagon indicates a user dialog act. In trajectory 250-1, the first agent act (A1) was classified as some dialog act 211-Y, and the first user act (U1) was classified as some dialog act 212-X. Similarly, in trajectory 250-2, the first agent act (A1) was classified as some dialog act 211-D, and the first user act (U1) was classified as some dialog act 212-G. Subsequent dialog acts in each trajectory have associated classifications (not shown).

In some embodiments, fewer than all of the parties in a conversation are modeled. For example, in dialogs where one party has more training in the topic of conversation than another party, the more sophisticated party may have more predictable speech patterns. In healthcare, a nurse or physician on one side of a dialog likely has significantly more relevant training than a patient on the other side of the dialog. Similarly, in the customer service context, the customer service agent is likely better versed in the products or services to which the agent is providing support than the customer. Nurses or agents trying to diagnose a problem likely progress through a similar set of actions to isolate the root cause of the problem. Thus, the flow of a dialog may be guided by the party with more training, and thus the corresponding trajectory may be keyed to only that party's statements in a dialog.

In some embodiments, multiple, sequential statements from the same party in a conversation are collapsed into a single statement. For example, user statements 207-1 can be treated as a single user statement, and agent statements 207-2 can be treated as a single agent statement (not shown in trajectory 250-2). By collapsing statements, dialogs 205 are normalized such that the resulting trajectory does not have sequential dialog acts from the same speaker.

Figure 3:
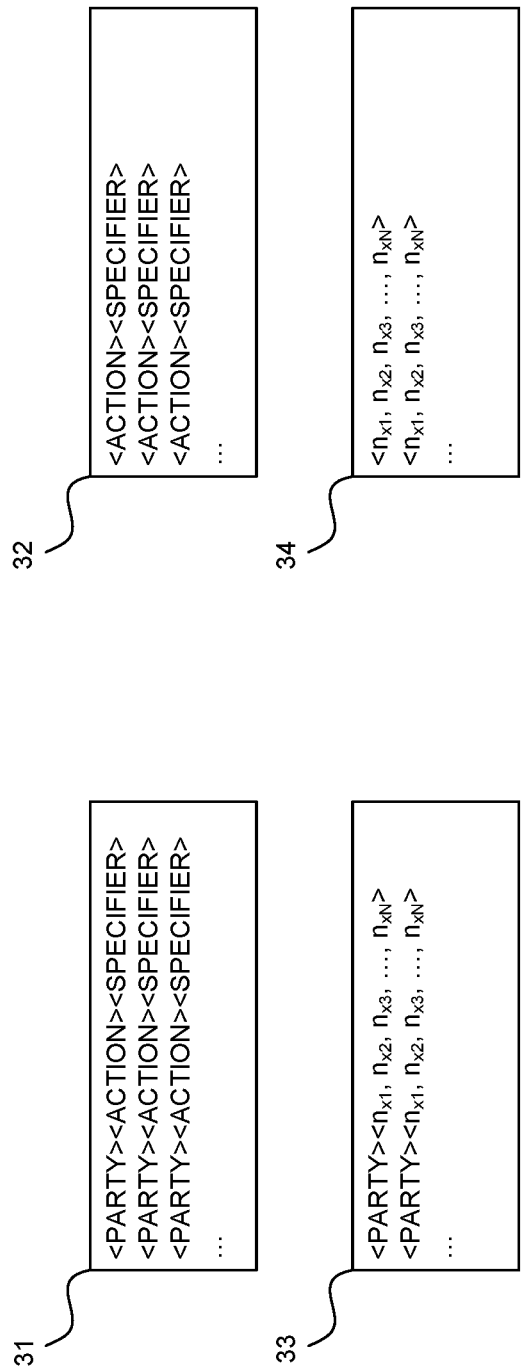
FIG. 3 illustrates exemplary trajectory formats according to some embodiments.

FIG. 3 illustrates exemplary trajectory formats according to some embodiments. In general, a trajectory is a data structure that represents a dialog with in-order dialog acts based on an utterance model. Trajectories may be represented as sequences of strings or numeric values. For example, trajectory 31 includes strings identifying party, action, and specifier. Trajectory 32 may be a trajectory derived from only a single speaker and thus omits a party identifier. Note that a party identifier may be a string or a numeric value. Trajectory 33 includes party identifiers and numeric vectors representing dialog acts in the form $<n_{x1}, n_{x2}, n_{x3}, n_{xN}>$, where n represents values in a vector of length N corresponding to the statement number, x, in the corresponding dialog. The vector may correspond to the classifications corresponding cluster centroid. Like trajectory 32, trajectory 34 omits a party identifier, if, for example, only one party's statements form the basis for modeling a trajectory.

Figure 4:
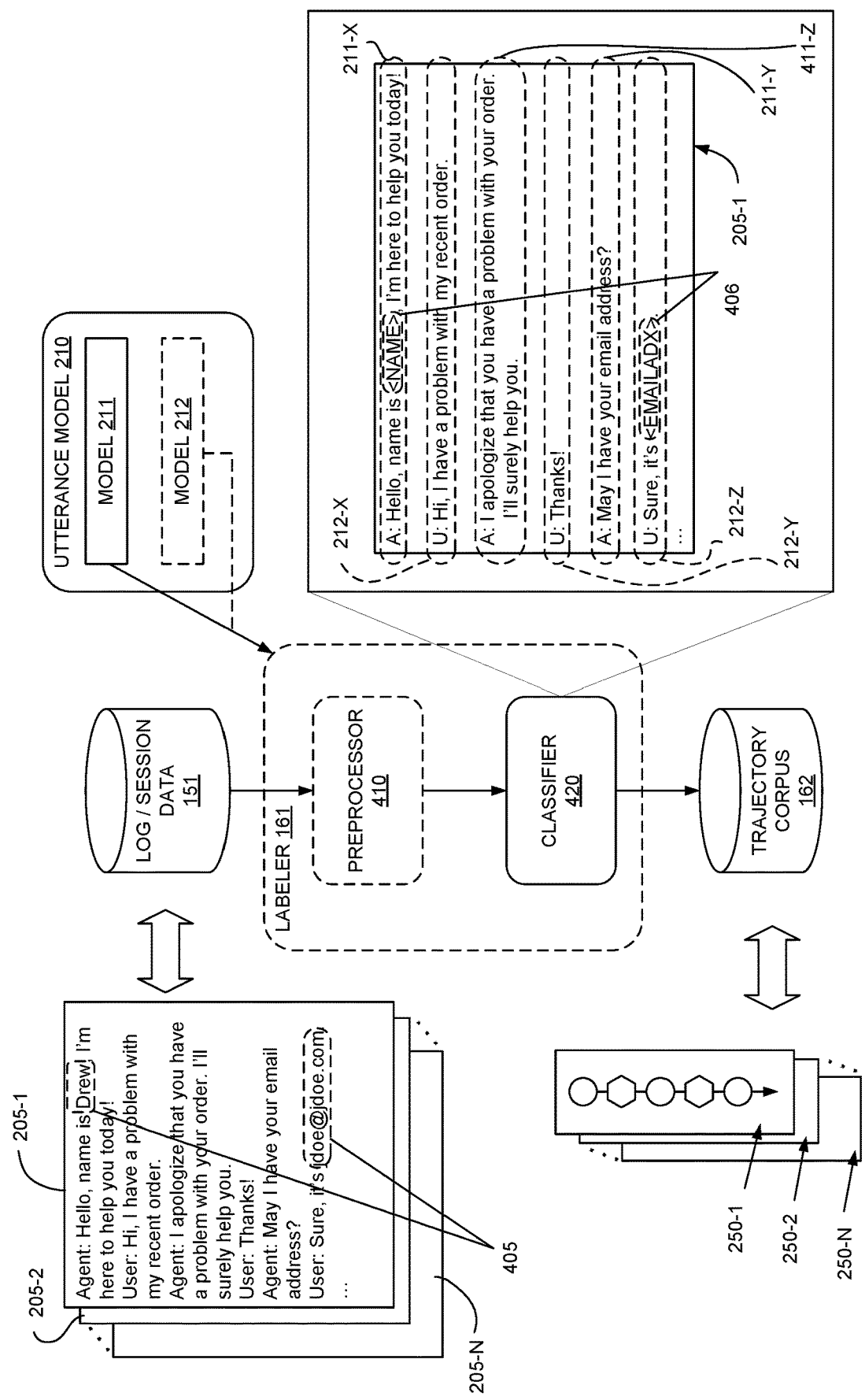
FIG. 4 illustrates building a trajectory corpus from dialogs according to some embodiments.

FIG. 4 illustrates building a trajectory corpus from dialogs according to some embodiments. Labeler 161 builds the trajectory corpus from dialogs stored in log or session data 151. Labeler 161 includes classifier 420 and, in some embodiments, preprocessor 410. Labeler 161 receives dialogs 205 from log or session data 151. Dialogs 205 can include previously recorded dialogs between users and human agents of service provider system 100.

Preprocessor 410 "cleans" the raw dialogs 205 before they are processed by classifier 420. For example, dialogs may contain user or agent specific information 405 that can be replaced by generic tags 406. Preprocessor 410 may further process dialogs 205 to tokenize or lemmatize their content, remove language stop words, etc. These preprocessing steps can improve the performance of the classifier 420.

Classifier 420 is a supervised or unsupervised machine learning model configured to build a trajectory for each dialog based on the utterance model 210. In an unsupervised model, classifier 420 uses a clustering algorithm to cluster statements in the dialogs and assign classifiers to the clusters. In a supervised process, statements in some subset of the dialogs 205 may be annotated based on the utterance model 210 to generate a set of training dialogs. In some embodiments, classifier 420 is a supervised multinomial classifier that predicts statement classifications based on the statement annotations in the training data set. As classifier 420 classifies statements in a dialog 205, classifier 420 generates and stores one or more trajectories 250 in trajectory corpus 162. After classification, trajectory corpus 162 can include at least one trajectory 250 from each sample dialog 205. Trajectories 250 in trajectory corpus 162 are then be used to simulate user dialog, as described below.

Figure 5:
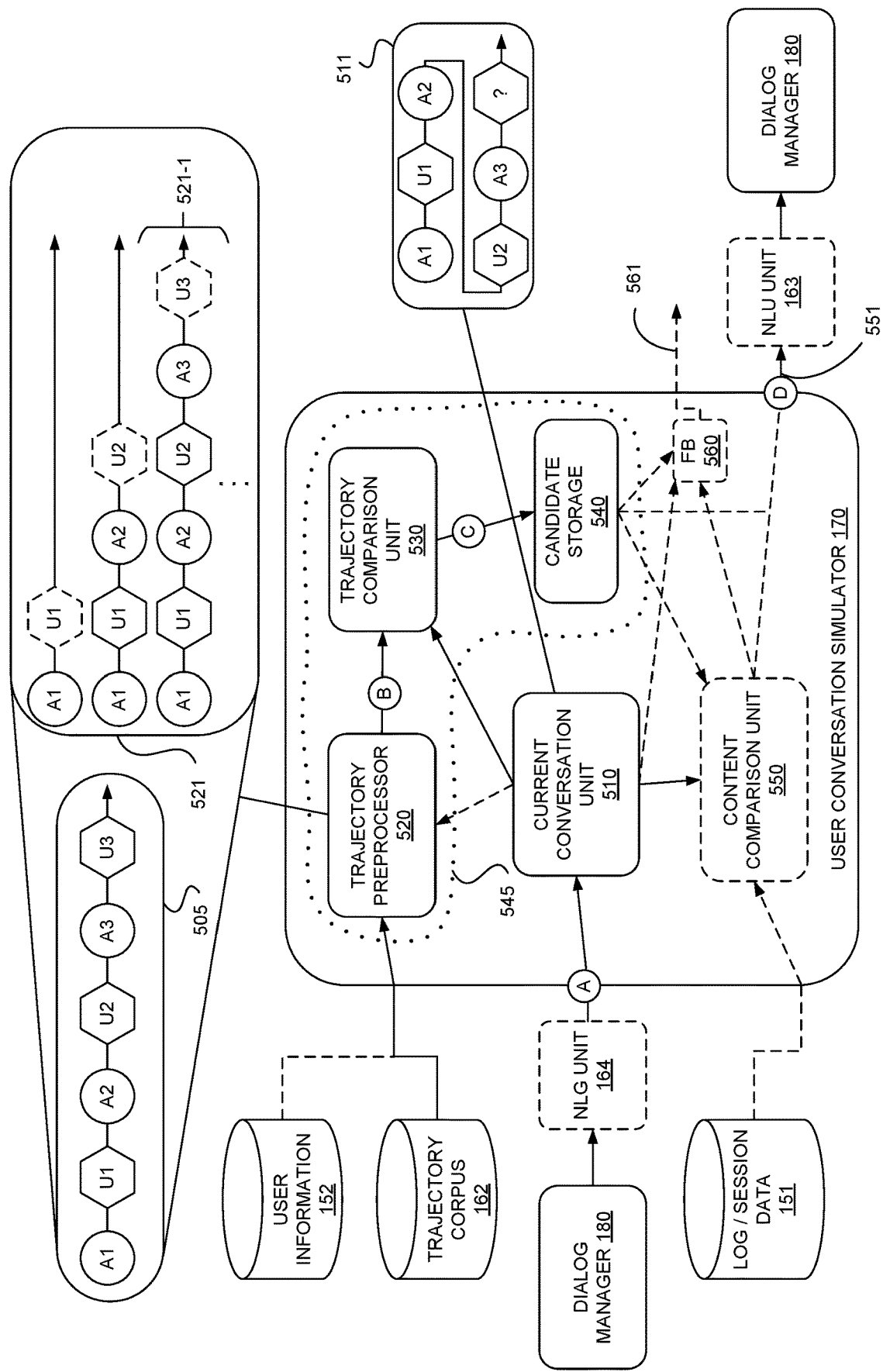
FIG. 5 illustrates a user conversation simulator according to some embodiments.

FIG. 5 illustrates a user conversation simulator 170 according to some embodiments. The user conversation simulator 170 includes current trajectory unit 510, trajectory preprocessor 520, trajectory comparison unit 530, candidate storage 540, optional content comparison unit 550, and FB (feedback) unit 560. User conversation simulator 170 receives as inputs trajectories from trajectory corpus 162, agent dialog acts or utterances from dialog manager 180 or NLG unit 164, respectively, and, optionally, dialogs from log or session data 151 and user data from user information 152. In some embodiments, dialogs and corresponding trajectories may be combined into a single data structure stored in trajectory corpus 162, log or session data 151, or in another data store (not shown) providing input to user conversation simulator 170. User conversation simulator 170 generates as outputs simulated user dialog acts or statements 551 and, optionally, feedback 561.

In some embodiments, user conversation simulator 170 and dialog manager 180 may communicate via dialog acts rather than statements or utterances, assuming the dialog act classifiers in the utterance model used to generate trajectories correspond to dialog acts that can be input to or output from the dialog manager 180. In such embodiments, NLG unit 164 and NLU unit 163 can be omitted during training of dialog manager 180.

At a high-level, the flow of user conversation simulator 170 is indicated by circles A through D, where the flow begins at circle A when the user conversation simulator receives the most recent dialog act or utterance from dialog manager 180 or NLG unit 164, respectively, and ends at circle D when user conversation simulator 170 outputs a simulated user dialog act or statement 551. Beginning at circle A, current trajectory unit 510 receives an agent dialog act and either begins a new current trajectory or updates an existing current trajectory, depending on whether the previous dialog ended. In some embodiments, the previous dialog ends when user conversation simulator 170 matches the current trajectory to a candidate trajectory, as described below, that has only one remaining dialog act in the base trajectory. The agent dialog act may be received directly from dialog manager 180 or, if previously converted to an agent utterance by NLG unit 164, current trajectory unit 510 can include a classifier similar to classifier 420 to classify an agent utterance as an agent dialog act.

Exemplary current trajectory 511 includes three agent dialog acts (A1-A3) and two user dialog acts (U1 and U2). Having received agent dialog act A3, user conversation simulator 170 determines the next user dialog act in the trajectory, indicating by the hexagon marked with a "?". In addition to maintaining the conversation trajectory for the current dialog, current trajectory unit 510 can maintain a log of the corresponding natural language dialog or conversation, which can be used later for content comparison.

To determine the next user dialog act, trajectory comparison unit 530 compares the current dialog trajectory against candidate trajectories received from trajectory preprocessor 520 at circle B. Trajectory preprocessor 520 generates one or more candidate trajectories for comparison by the trajectory comparison unit 530 from trajectories within the trajectory corpus 162. In some embodiments, trajectory preprocessor 520 generates candidate trajectories from each trajectory in trajectory corpus 162. In other embodiments, trajectory preprocessor 520 can use data in user information 152 to pre-filter which trajectories in the trajectory corpus 162 are used to generate candidate trajectories, as described below. A single trajectory 505 within trajectory corpus 162 can originate a number of candidate trajectories 521. Additional details regarding the generation of candidate trajectories by trajectory preprocessor 520 are provided in FIG. 6 and the associated discussion.

Trajectory comparison unit 530 compares candidate trajectories (e.g., 521) from trajectory preprocessor 520 with the current trajectory e.g., 511) maintained by current trajectory unit 510. The dashed hexagons in candidate trajectories 521 represent candidate user dialog acts that correspond to user statements in the corresponding dialog. Trajectory comparison unit 530 may use a distance metric, such as the Levenshtein distance, Hamming distance, cosine distance, etc., which may be selected depending on how the trajectories are represented, to calculate a score each comparison. In some embodiments, trajectory comparison unit 530 maintains a value representing the maximum similarity (or minimum distance) score obtained from the comparison. The value is reset whenever current trajectory unit 510 begins a new trajectory. Each time a candidate trajectory comparison meets or exceeds that value, trajectory comparison unit 530 stores the candidate trajectory or a reference thereto in candidate storage 540. Candidate storage 540 is a memory that stores each candidate trajectory or references to candidate trajectories that "best" match the current trajectory.

Operations carried out within the portion 545 of the user conversation simulator 170 may be performed a number of times before a candidate stored in candidate storage 540 is used to determine the next user dialog act to output at circle D. Such operations can be pipelined. For example, trajectory preprocessor 520 may generate a single candidate trajectory for comparison by trajectory comparison unit 530 while trajectory comparison unit 530 performs a comparison of a previously generated candidate trajectory to the current trajectory and updates candidate storage 540, if necessary. In some embodiments, trajectory preprocessor 520 provides groups of candidates to trajectory comparison unit 530, e.g., groups of candidate trajectories generated from the same trajectory within trajectory corpus 162.

Once the "best" candidates have been stored in candidate storage 540 from the set of candidates generated by trajectory preprocessor 520, at circle D, the user conversation simulator 170 must determine the next user dialog act or statement 551. User conversation simulator 170 may randomly select one of the "best" candidates in candidate storage 540 or may select one via content comparison unit 550, which further differentiates among the "best" candidates (assuming there are more than one). Regardless of the type of selection, if candidate 521-1 is selected as the match for current trajectory 511, the next user dialog act or utterance would correspond to U3.

Content comparison unit 550 compares the dialog corresponding to the current trajectory with the dialogs corresponding to each of candidate trajectory in candidate storage 540. In other words, content comparison unit 550 looks at the utterances in the dialogs to differentiate among the "best" candidates. Content comparison unit 550 may evaluate the lexicon, syntax, semantics and/or other characteristics of one or more statements in the corresponding dialogs. In one embodiment, content comparison unit compares the dialogs using the term-frequency inverse-document frequency ("TD-IDF") statistic to calculate a score representing the similarity of the terms in each candidate with the terms in the current dialog. Content comparison unit 550 applies TF-IDF across the entire dialogs or to individual utterances in the dialog. In one embodiment, content comparison unit 550 only compares the last agent utterances in the candidate trajectories stored in candidate storage 540 and the current trajectory. In another embodiment, content comparison unit 550 compares the last N utterances in the compared trajectories, where N is 1, 2, 3, etc. up to the total number of statements in the trajectory. In some embodiments where content comparison unit 550 compares multiple statements, content comparison unit 550 compares the final statement in the current trajectory with the final statement in a candidate trajectory, the second to final statement in the current trajectory with the second to final statement in the candidate trajectory, etc. The scores of the various comparisons may be summed into a final score. In performing the summation, scores of statements are weighted based on their recency in the dialog in some embodiments. For example, content comparison unit 550 weights the comparison of the final statements more heavily than the comparison of the second to final statements. After comparison, user conversation simulator 170 outputs the next user dialog act or utterance from the candidate trajectory with the top content comparison score.

Optional feedback unit 560 outputs an indicator of the score used to select the candidate trajectory from which the next user dialog act was derived. If the candidate trajectory was randomly selected, feedback unit 560 may output the comparison score obtained by the trajectory comparison unit 530. If the content comparison unit 550 further differentiated amongst candidate trajectories, the content comparison score is output. The output score may be used by trainer 191 as a feedback value for a reward function that represents how closely the last agent dialog action selected by dialog manager 180 aligned with the selected candidate trajectory.

Figure 6:
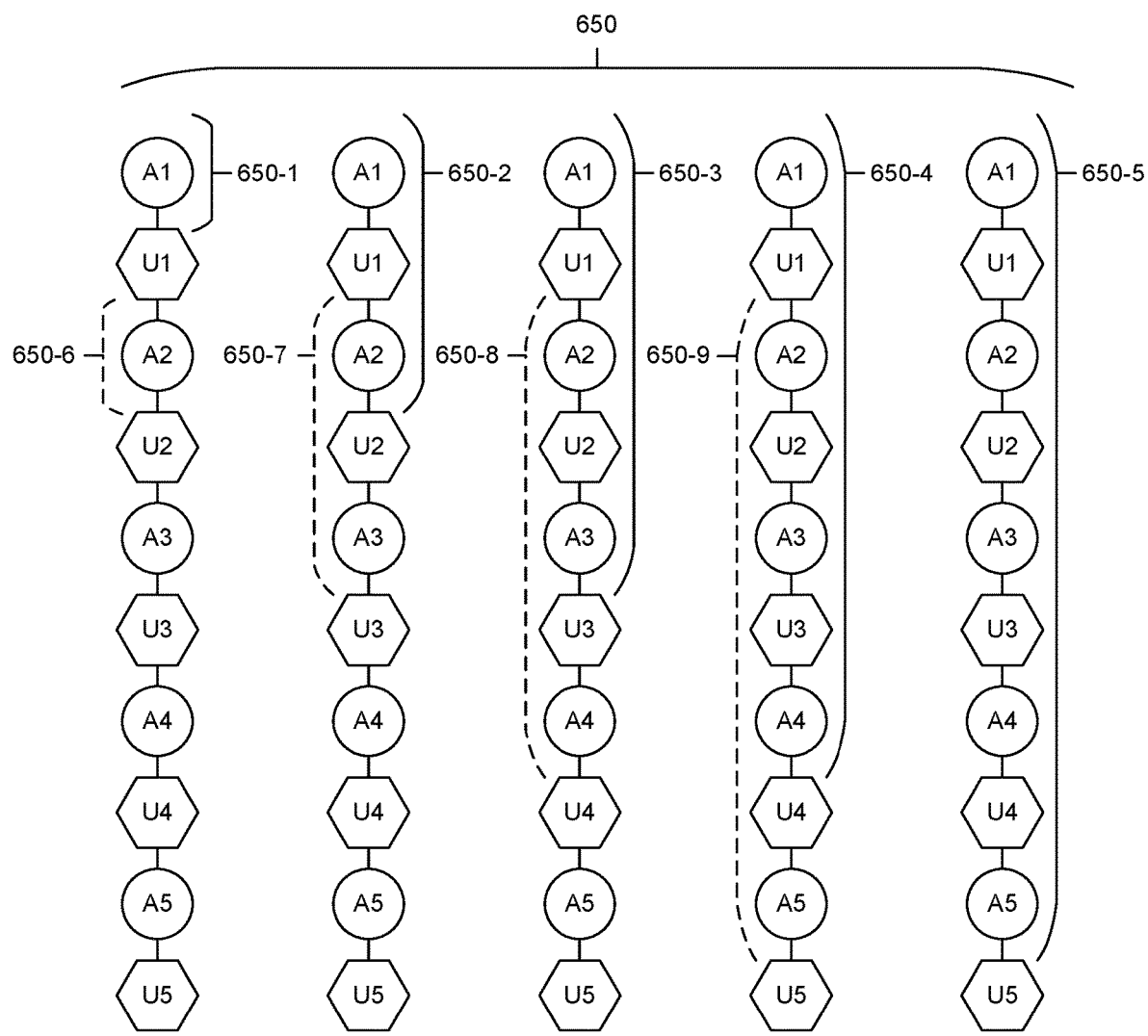
FIG. 6 illustrates a trajectory and its associated candidate trajectories according to some embodiments.

FIG. 6 illustrates an exemplary trajectory 650 and its associated candidate trajectories 650-N. As described above, trajectory preprocessor 520 generates candidate trajectories from trajectories in the trajectory corpus 162. A trajectory from the trajectory corpus may be referred to as a "base" trajectory. The illustrated base trajectory 650 is a dialog consisting of ten user and agent statements in the order shown. In some embodiments, because user conversation simulator 170 attempts to determine the next user dialog act in a current conversation, each user dialog act (U1 through U5) in the "base" trajectory 650 is a possible next user dialog act, and each sequence of dialog acts leading up to a next user dialog act is a candidate trajectory. For example, if user conversation simulator 170 scores candidate trajectory 650-4 as the "best" candidate for the current trajectory, dialog act U4 would determine the output user dialog act or statement 551. Note that in cases where a dialog ends on a user dialog act, the final candidate trajectory corresponds to the base trajectory. In some embodiments, a candidate trajectory may include the possible next user dialog act, which would be excluded from the trajectory comparisons.

User conversation simulator 170 outputs simulated user dialog acts or utterances 551, depending on whether user conversation simulator 170 and dialog manager 180 are communicating on a statement-level or dialog act-level. Continuing the above example, if candidate trajectory 650-4 is the "best" candidate, user conversation simulator 170 would look up or read the user utterance corresponding to dialog act U4 in base trajectory 650 and output that utterance at 551. Conversely, if the simulation is operating at a dialog act-level, user conversation simulator 170 would output dialog act U4 at 551. In embodiments where the next user dialog act is included in the candidate trajectory, user conversation simulator 170 can output the user utterance or user dialog act without referencing the base trajectory 650.

In some embodiments, trajectory preprocessor 520 only generates candidate trajectories that begin from the start of a "base" trajectory. For example, for base trajectory 650, only candidates 650-1 through 650-5 are generated, each beginning with dialog act A1. from a single "base" trajectory, where the starting dialog act of the candidate trajectories does not change. In other embodiments, trajectory preprocessor 520 may generate additional candidate trajectories that do not have fixed starting dialog act. For example, candidate trajectories 650-6 through 650-9 begin with the second agent dialog act, A2.

Various optimizations may be employed to reduce the number of comparisons performed by the trajectory comparison unit 530. One optimization involves monitoring comparison scores and terminating comparisons of candidate trajectories associated with the same base trajectory if the scores begin to diverge from a "best" (e.g., peak) score for the base trajectory. For example, if one candidate trajectory scores 0.8, and the next three candidate trajectories score, in order, 0.7, 0.4, 0.1, the trajectory comparison unit 530 may signal to the trajectory preprocessor to move on to the next trajectory in the trajectory corpus 162.

Another optimization is the limiting of the size of candidate trajectories to the size of the current trajectory. For example, if the current trajectory includes N dialog acts, trajectory preprocessor 520 may limit generated candidate trajectories to lengths equal to N, less than N, or equal to or less than N.

Another optimization is pre-filtering trajectories in the trajectory corpus based on the current trajectory. As mentioned above, dialog acts may include classifications that differentiate among topical areas or types of users. If trajectory preprocessor 520 detects that the current trajectory includes a dialog act that narrows the conversation, trajectory preprocessor 520 may automatically skip trajectories in the trajectory corpus that do not include a related dialog act. For example, if the simulated user in the current conversation has previously requested information about a particular health condition, trajectories that do not have dialog acts related to that health condition may be excluded from the set of trajectories the trajectory preprocessor 520 uses to generate candidate trajectories.

Figure 7:
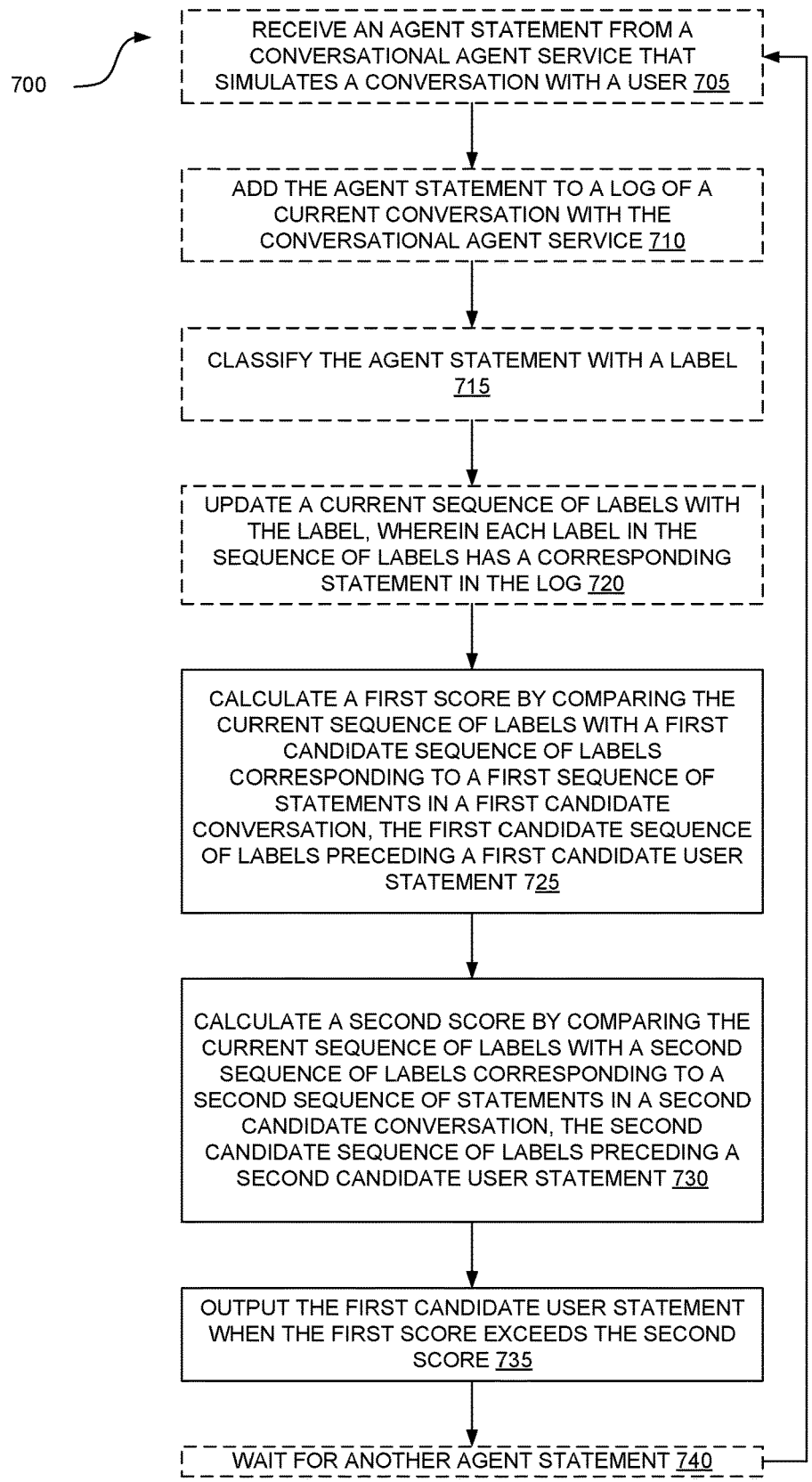
FIG. 7 illustrates a method of outputting a user action in a conversation according to some embodiments.

FIG. 7 illustrates a method 700 of outputting a user utterance in a conversation according to some embodiments. Some or all of the operations 700 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 700 are performed by user conversation simulator 170 of the other figures.

The operations 700 include, at block 705, receiving an agent statement from a conversational agent service that simulates a conversation with a user. At block 710, adding the agent statement to a log of a current conversation with the conversational agent service. The log of the current conversation can include all previous statements between a user conversation simulator and a dialog manager (if any), as described above. Current trajectory unit 510 can maintain the log of the current conversation, as described above. At block 715, classifying the agent statement with a label. Current trajectory unit 510 can perform the classification, as described above. At block 720, updating a current sequence of labels with the label, wherein each label in the sequence of labels has a corresponding statement in the log. Current trajectory unit 510 can maintain the current sequence of labels, as described above. At block 725, calculating a first score by comparing the current sequence of labels with a first candidate sequence of labels corresponding to a first sequence of statements in a first candidate conversation, the first candidate sequence of labels preceding a first candidate user statement. At block 730, calculating a second score by comparing the current sequence of labels with a second sequence of labels corresponding to a second sequence of statements in a second candidate conversation, the second candidate sequence of labels preceding a second candidate user statement 730. Trajectory comparison unit 530 and/or content comparison unit 550 can calculate the first and second scores, as described above. At block 735, outputting the first candidate user statement when the first score exceeds the second score, and at block 750, waiting for another agent statement. Both operations can be performed by the user conversation simulator 170, as described above.

As depicted, method 700 involves a user conversation simulator 170 and dialog manager 180 communicating at a statement-level. If they communicate at a dialog act-level, method 700 is modified as described herein (e.g., skipping operations 705 through 720 and instead receiving an agent dialog act from a conversational agent service, outputting a user dialog act instead of a user statement at block 735, etc.) in some embodiments.

Figure 8:
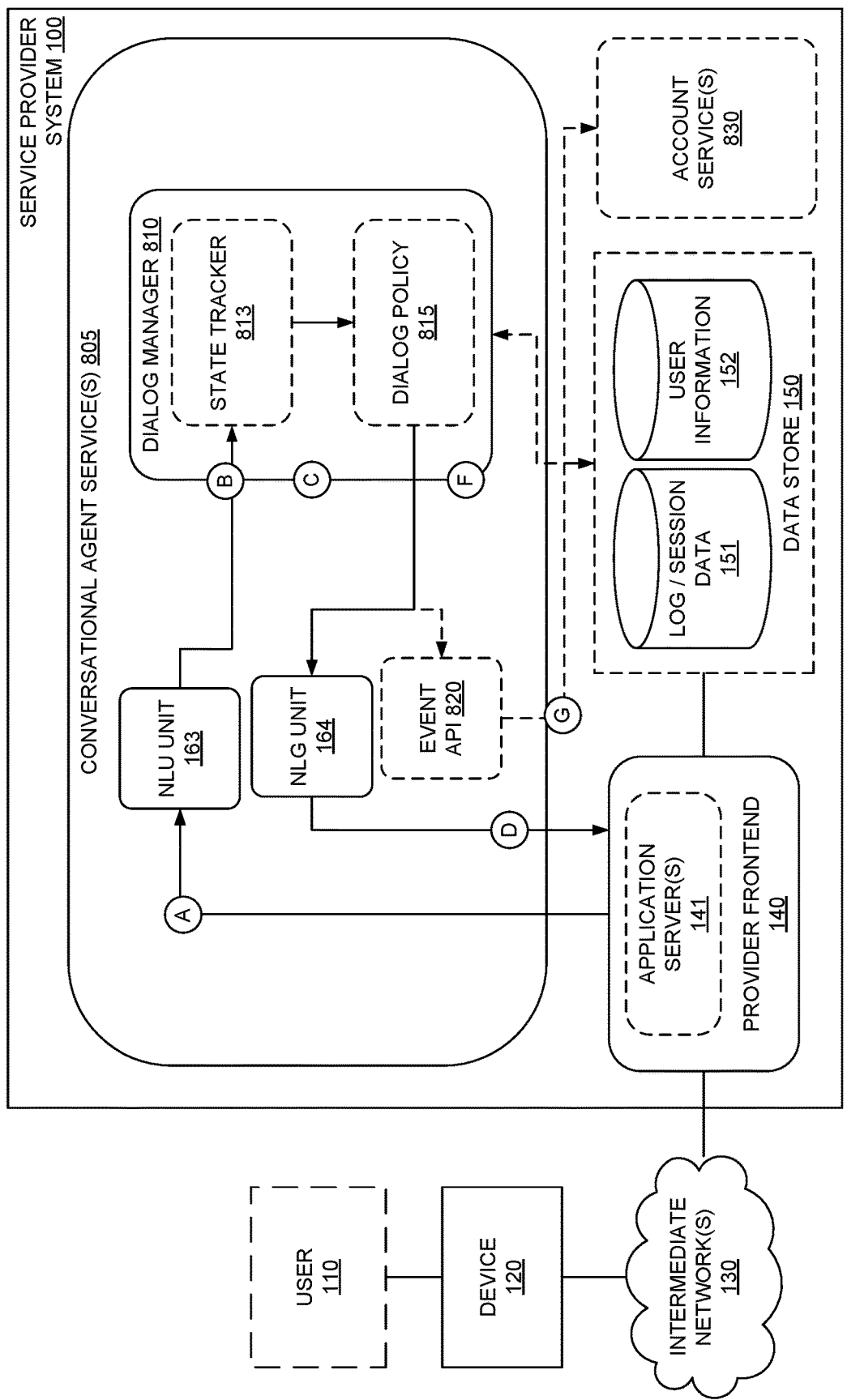
FIG. 8 illustrates an environment for deploying a conversation agent service according to some embodiments.

FIG. 8 illustrates an environment for deploying a conversation agent service according to some embodiments. As compared to FIG. 1, CA services 805 include a trained dialog manager 810. As in FIG. 1, dialog manager 810 is based on a Markov Decision Process ("MDP") model, with state tracker 813 tracking the state of a conversation and, based on that state, dialog policy 815 determining the next CA dialog act. At a high-level, the flow of a conversation with trained dialog manager 810 is indicated by circles A through D, one cycle of which represents each side in the conversation having had a "turn" at dialog. Here, user 110 or device 120, rather than user conversation simulator 170, is in communication with dialog manager 180. For example, user 110 may be a customer of service provider system 100 and initiate a conversation with CA services 805 via one or more application servers 141 that are part of provider frontend 140. At circle A, the user statement is passed to NLU unit 163. NLU unit 163 converts the statement to a user dialog act and passes the user dialog act to the dialog manager 810. The dialog manager evaluates the user dialog act and, in response, specifies an agent dialog act, which is output to NLG unit 164 at circle C. NLG unit 164 converts the agent dialog act into a natural language utterance, which, at circle D, is then transmitted back to the user 110 via provider frontend 140.

Figure 9:
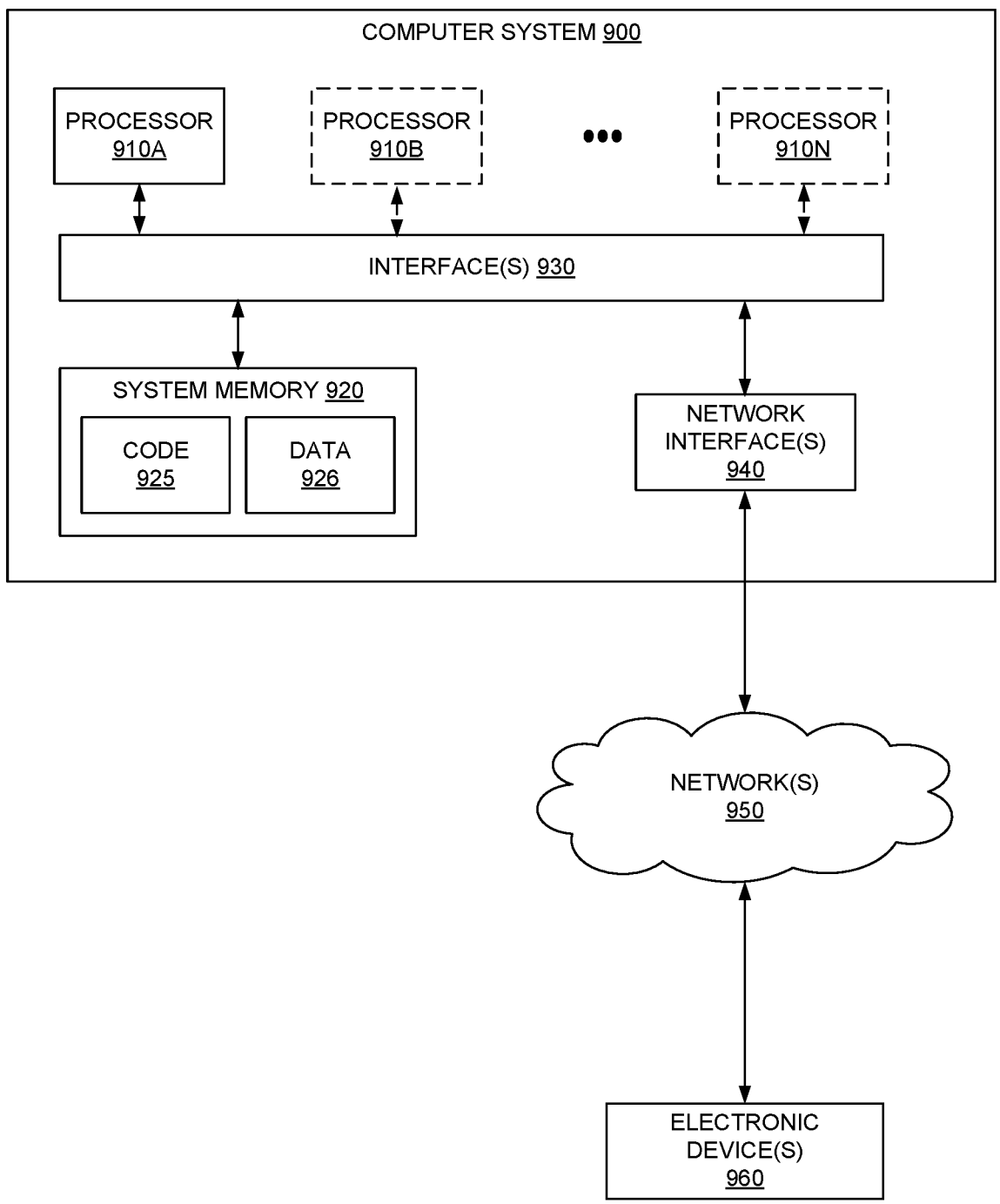
FIG. 9 is a block diagram illustrating an example computer system that may be used in some embodiments.

FIG. 9 is a block diagram illustrating an example computer system that may be used in some embodiments. In some embodiments, a system that implements a portion or all of the techniques for simulating a user conversation as described herein may include a general-purpose computer system that includes or is configured to access one or more computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930. While FIG. 9 shows computer system 900 as a single computing device, in various embodiments a computer system 900 may include one computing device or any number of computing devices configured to work together as a single computer system 900.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 910 may commonly, but not necessarily, implement the same ISA.

System memory 920 may store instructions and data accessible by processor(s) 910. In various embodiments, system memory 920 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for resizing virtual networks in provider network environments, are shown stored within system memory 920 as code 925 and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices as illustrated in FIG. 1, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks (SANs) such as Fibre Channel SANs, or via I/O any other suitable type of network and/or protocol.

In some embodiments, system memory 920 may be one embodiment of a computer-accessible medium configured to store program instructions and data as described above for FIG. 1 for providing customer hosted endpoints in provider network environments. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

Various embodiments may further include receiving, sending, or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle(R), Microsoft(R), Sybase(R), IBM(R), etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
receiving an agent statement from a conversational agent service that simulates a conversation with a user;
adding the agent statement to a log of a current conversation with the conversational agent service;
classifying the agent statement with a label;
updating a current sequence of labels with the label, wherein each label in the sequence of labels has a corresponding statement in the log;
calculating a first score by comparing the current sequence of labels with a first candidate sequence of labels corresponding to a first sequence of statements in a first candidate conversation, the first candidate sequence of labels preceding a first candidate user statement;
calculating a second score by comparing the current sequence of labels with a second sequence of labels corresponding to a second sequence of statements in a second candidate conversation, the second candidate sequence of labels preceding a second candidate user statement; and
outputting the first candidate user statement when the first score exceeds the second score.

2. The computer-implemented method of claim 1, wherein the calculating the first score and the second score further comprises a content-based comparison of the log of the current conversation with the first sequence of statements in the first candidate conversation and the second sequence of statements in the second candidate conversation, respectively.

3. The computer-implemented method of claim 1, wherein the first score and the second score are calculated using a distance metric.

4. A computer-implemented method comprising:
in a user simulation service,
comparing a current sequence of stored labels corresponding to statements in a dialog with a plurality of candidate sequences of labels corresponding to statements in a plurality of candidate dialogs to identify a matching sequence of labels, identifying a base sequence of labels that includes the matching sequence of labels to identify a label corresponding to an act in the base sequence following the matching sequence, and issuing the act to a conversation agent service to be used as a simulated user act.

5. The computer-implemented method of claim 4, wherein the current sequence of stored labels, the plurality of candidate sequences of labels, the matching sequence of labels, and the base sequence of labels are data structures representing ordered sequences of dialog statements.

6. The computer-implemented method of claim 5, wherein the comparing includes comparing a final dialog statement associated with the current sequence of stored labels with only a final dialog statement associated with one of the plurality of candidate sequences of labels.

7. The computer-implemented method of claim 5, wherein the current sequence of stored labels relates only to dialog statements attributed to a single party to the dialog.

8. The computer-implemented method of claim 4, further comprising outputting a feedback signal based on a score, the score based on a metric comparing the current sequence of stored labels to the matching sequence of labels.

9. The computer-implemented method of claim 4, wherein the comparing includes:
measuring a distance between the current sequence of stored labels and each of the plurality of candidate sequences of labels to generate a subset of sequences; and
measuring a content-based similarity between a statement in a dialog corresponding to the current sequence of stored labels and a statement in each dialog corresponding to a sequence in the subset of sequences.

10. The computer-implemented method of claim 5, wherein data in at least one of the data structures structure classifies each statement of at least one party in the ordered sequence of dialog statements.

11. The computer-implemented method of claim 4, wherein the plurality of candidate sequences of labels originate from a single dialog.

12. The computer-implemented method of claim 4, wherein the current sequence of stored labels models the dialog with the conversation agent service.

13. A system comprising:
a conversation agent service implemented by a first one or more electronic devices; and
a user simulation service implemented by a second one or more electronic devices, the user simulation service including instructions that upon execution cause the second one or more electronic devices to:
compare a current sequence of stored labels corresponding to statements in a dialog with a plurality of candidate sequences of labels corresponding to statements in a plurality of candidate dialogs to identify a matching sequence of labels;
identify a base sequence of labels that includes the matching sequence of labels to identify a label corresponding to an act in the base sequence of labels following the matching sequence of labels; and
issue the act to the conversation agent service to be used as a simulated user act.

14. The system of claim 13, wherein the current sequence of stored labels, the plurality of candidate sequences of labels, the matching sequence of labels, and the base sequence of labels are data structures representing ordered sequences of dialog statements.

15. The system of claim 13, wherein the comparing includes comparing a final dialog statement associated with the current sequence of stored labels with only a final dialog statement associated with one of the plurality of candidate sequences of labels.

16. The system of claim 13, wherein the current sequence of stored labels relates only to dialog statements attributed to a single party to the dialog.

17. The system of claim 13, wherein the instructions further cause the second one or more electronic devices to output a feedback signal based on a score, the score based on a metric comparing the current sequence of stored labels to the and the matching sequence of labels.

18. The system of claim 13, wherein the comparing includes:
measuring a distance between the current sequence of stored labels and each of the plurality of candidate sequences of labels to generate a subset of sequences; and
measuring a content-based similarity between a statement in a dialog corresponding to the current sequence of stored labels and a statement in each dialog corresponding to a sequence in the subset of sequences.

19. The system of claim 14, wherein data in at least one of the data structures classifies each statement of at least one party in the ordered sequence of dialog statements.

20. The system of claim 13, wherein the plurality of candidate sequences of labels originate from a single dialog.

* * * * *